(12) United States Patent
Montminy

(10) Patent No.: US 7,134,454 B2
(45) Date of Patent: Nov. 14, 2006

(54) CAP FOR BLOCKING A PIPE

(76) Inventor: Alain Montminy, 16 Grenoble, Ste-Catherine-de-la-Jacques-Cartier, Quebec (CA) G0A 3M0

( * ) Notice: Subject to any disclaimer, the term of this patent is extended or adjusted under 35 U.S.C. 154(b) by 67 days.

(21) Appl. No.: 11/020,335

(22) Filed: Dec. 27, 2004

(65) Prior Publication Data

US 2006/0138144 A1    Jun. 29, 2006

(51) Int. Cl.
*F16L 55/10*   (2006.01)
(52) U.S. Cl. .................. 138/89; 138/96 R; 220/325; 220/259.1
(58) Field of Classification Search .................. 138/89, 138/96 R, 96 T; 215/305; 220/324, 325, 220/256.1, 259.1
See application file for complete search history.

(56) References Cited

U.S. PATENT DOCUMENTS

| | | | |
|---|---|---|---|
| 128,207 A | 6/1872 | Booth et al. | 292/257 |
| 1,224,934 A | 5/1917 | Kenny | 292/258 X |
| 1,682,879 A | 9/1928 | Wilson | 292/258 |
| 1,817,796 A | 8/1931 | Arnott | 292/258 |
| 2,180,633 A | 11/1939 | Holt | 411/405 |
| 2,946,215 A | 7/1960 | Eshlaugh et al. | 70/169 |
| 3,152,507 A | 10/1964 | Wieber | 411/405 |
| 3,653,410 A | 4/1972 | West | 138/89 |
| 3,672,403 A | 6/1972 | Wilson et al. | 138/89 |
| 3,722,549 A * | 3/1973 | Wilson et al. | 138/89 |
| 3,907,155 A | 9/1975 | Smith et al. | 220/210 |
| D248,014 S | 5/1978 | DeCaro | 8/387 |
| 4,164,302 A | 8/1979 | Gerdes | 220/210 |
| 4,351,446 A | 9/1982 | Madden | 138/89 X |
| 4,562,709 A | 1/1986 | Canadas et al. | 70/169 |
| 4,707,323 A | 11/1987 | Vowell | 138/89 X |
| 4,809,542 A | 3/1989 | Jones | 73/45.8 |
| 5,000,339 A | 3/1991 | Wheat et al. | 220/203.07 |
| 5,181,806 A | 1/1993 | Grosswiller et al. | 406/189 |
| 5,255,294 A | 10/1993 | Bierwirth | 376/204 |
| 5,640,999 A | 6/1997 | Wood | 138/89 |
| 6,038,893 A | 3/2000 | Neeley | 70/175 |

* cited by examiner

*Primary Examiner*—Patrick Brinson

(57) ABSTRACT

A cap for blocking a pipe. The pipe has a rim at an end thereof. The rim defines a pipe aperture. The cap includes a body for blocking the pipe aperture, the body including a bore having a threaded bore portion. A latch is movably mounted on the body for movement between a latched position wherein the latch engages the rim, and an unlatched position wherein the latch disengages the rim. A plug is provided for threaded engagement with the threaded portion and converts a rotational movement of the plug relative to the bore into a translation movement of the plug relative to the bore between a plug first position and a plug second position. The plug is operatively coupled to the latch for moving the latch between the latched and the unlatched positions in response to the plug being moved between the first plug position and a second plug position.

29 Claims, 6 Drawing Sheets

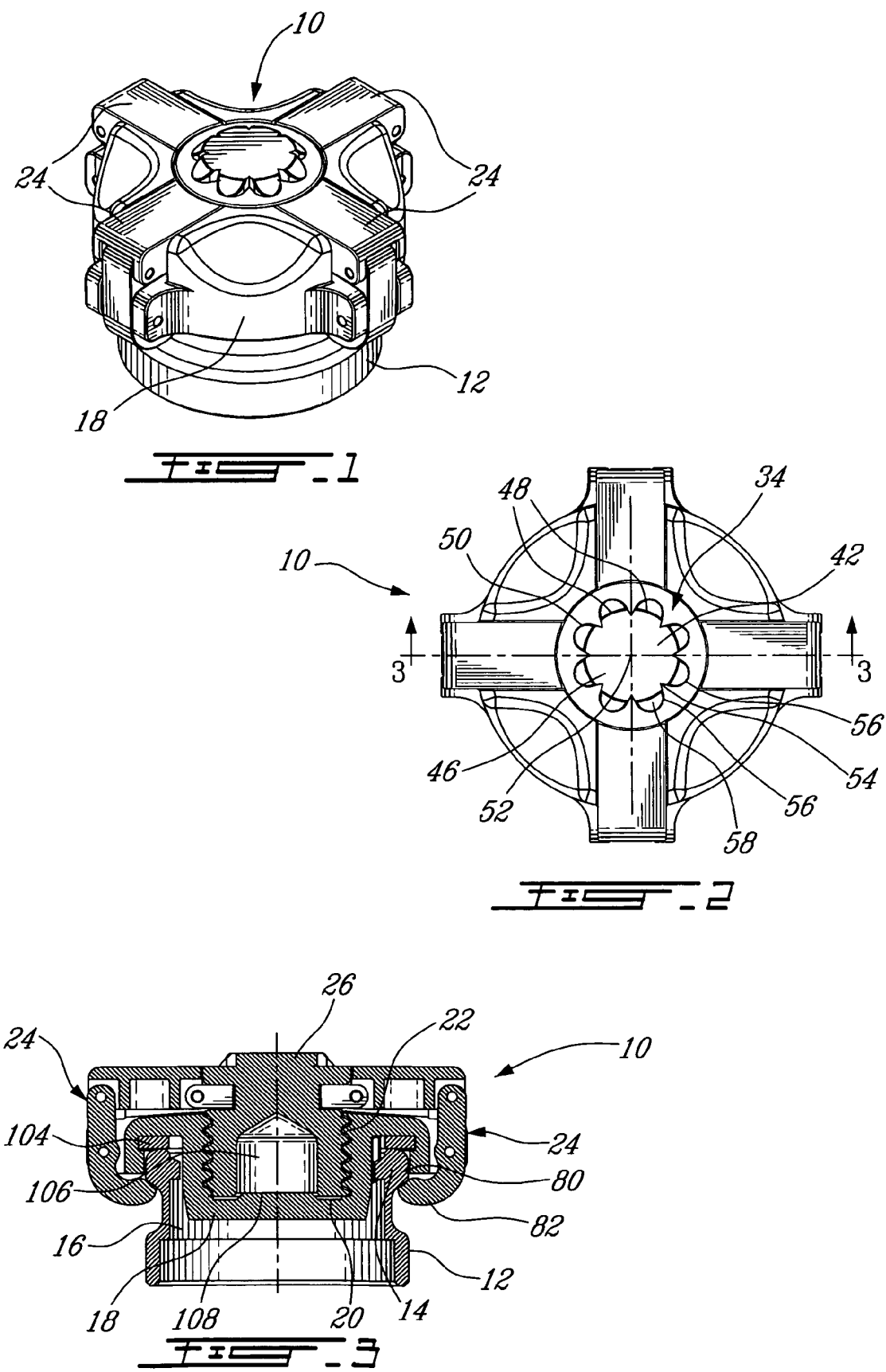

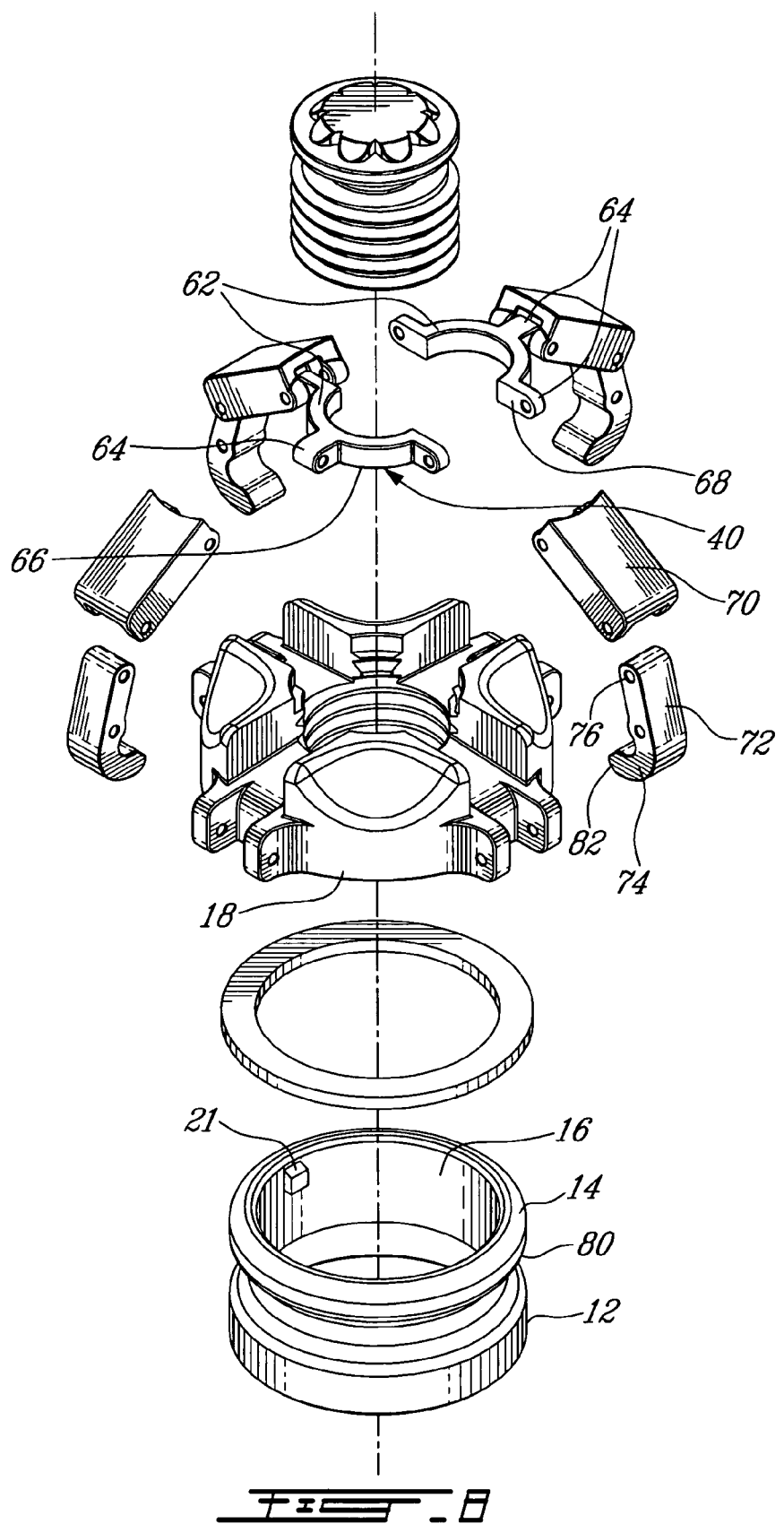

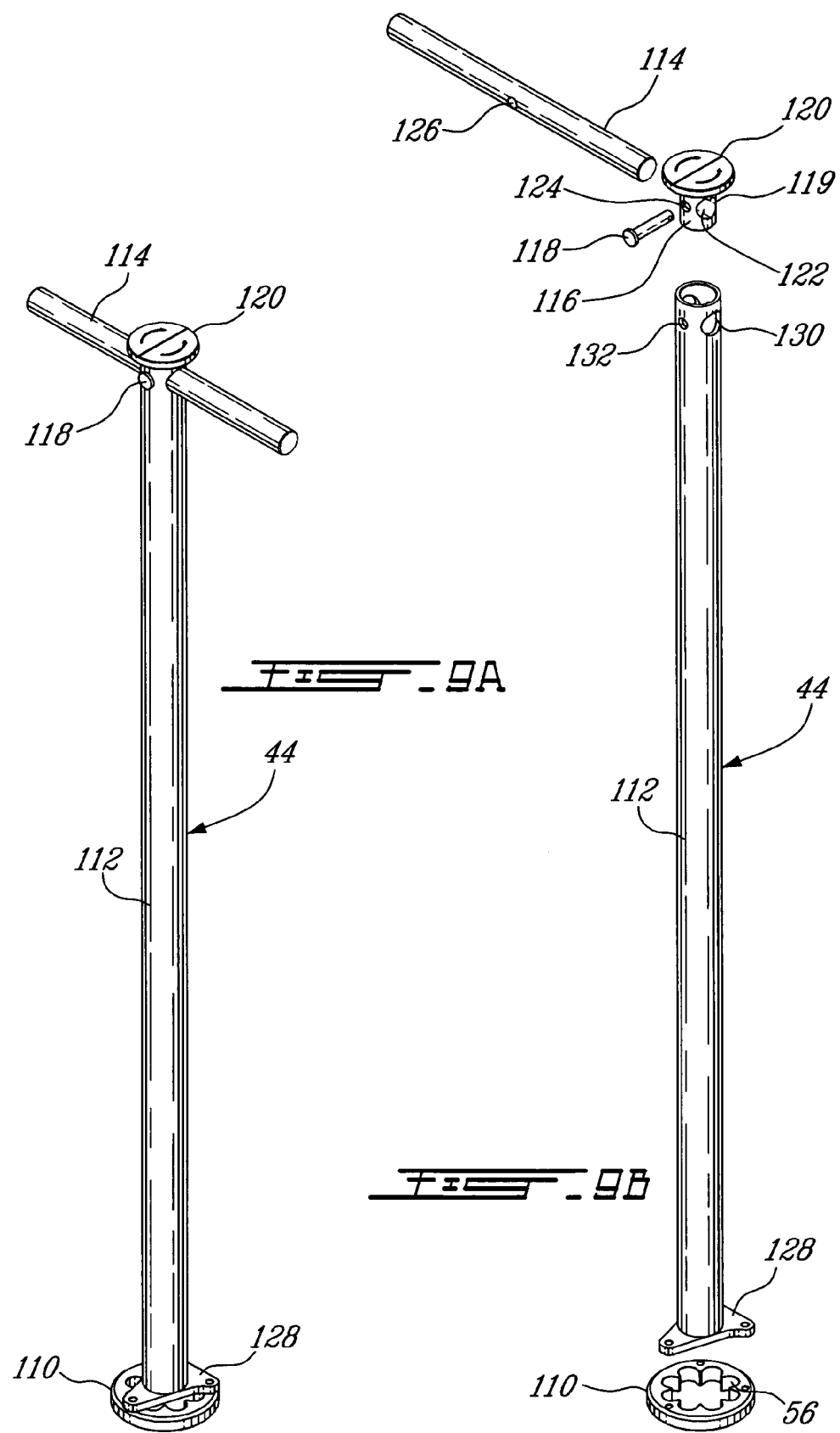

CAP FOR BLOCKING A PIPE

FIELD OF THE INVENTION

The present invention relates to the general field of caps and is particularly concerned with a cap for blocking a pipe.

BACKGROUND OF THE INVENTION

In many industries, there is a need to block an opening, such as an opening in a pipe. For example, in the fuel distribution industry, there is a need to prevent unauthorized access to fuel tanks. Indeed, underground storage tanks for gas in gas stations need to be protected against such unauthorized access for safety reasons, among others.

Currently, such storage tanks include a filling pipe to which a filling tube is attachable for refuelling the tank. When the tank is not refilled, there is a need to protect the opening of the pipe so that unauthorized persons cannot access this opening. In currently existing caps for such pipe openings, the cap is typically affixed to the pipe and a lock is secured to the cap so as to prevent an unauthorized person from releasing the cap from the pipe.

However, the locks that are typically used are relatively easy to break. In addition, such locks are exposed to water infiltration and therefore are prone to rust.

Also, when an authorized user wishes to access the pipe, there is a need to locate the key to the lock. If the key is not readily available there is a loss of time looking for the key or in trying to break the lock. In this last case a replacement lock also has to be provided.

Although the above example relates to the fuel distribution industry, there are also many other industries into which there is the need to block an opening in a pipe so that access by unauthorized persons is prevented.

Against this background, there exists a need in the industry to provide a novel cap for blocking a pipe.

OBJECTS OF THE INVENTION

An object of the present invention is therefore to provide an improved cap for blocking a pipe.

SUMMARY OF THE INVENTION

In a first broad aspect, the invention provides a cap for blocking a pipe. The pipe has a rim at an end thereof. The rim defines a pipe aperture. The cap includes a body for blocking the pipe aperture, the body including a bore having a threaded bore portion. A latch is movably mounted on the body for movement between a latched position wherein the latch engages the rim, and an unlatched position wherein the latch disengages the rim. A plug is provided for threaded engagement with the threaded portion and converts a rotational movement of the plug relative to the bore into a translation movement of the plug relative to the bore between a plug first position and a plug second position. The plug is operatively coupled to the latch for moving the latch between the latched and the unlatched positions in response to the plug being moved between the first plug position and a second plug position.

In a variant, a top surface of the plug defines a mating portion for mating with the tool and selectively allowing a rotation of the plug in response to a rotation of the tool.

Advantageously, the cap includes an integrated lock. The lock is defined by the mating portion. Also, if the plug, and more generally the whole cap, is made of a rust proof material, rusting problems associated with locking the cap are reduced.

In some embodiments of the invention, the mating portion is designed so as to be relatively hard to open without having access to the tool that mates with the mating portion. Therefore, if this tool is kept at a secure location, the cap provides for a relatively secure locking of the cap to the pipe aperture.

Furthermore, the cap is relatively inexpensive to manufacture and relatively easy to operate and install.

Yet furthermore, the cap provides a relatively secure manner of blocking the pipe aperture.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 1 is a perspective view of a cap according to the invention, the cap having latches that are in a latched position;

FIG. 2 is a top elevation view of the cap of FIG. 1;

FIG. 3 is a side cross-sectional view of the cap of FIG. 1, taken along the line 3—3 of FIG. 2;

FIG. 8 is an exploded perspective view of the cap of FIG. 1;

FIG. 9A is a perspective view of a tool for mating with a mating portion of a plug of the cap of FIG. 1;

FIG. 9B is an exploded view of the tool of FIG. 9A;

DETAILED DESCRIPTION

Figure 4:
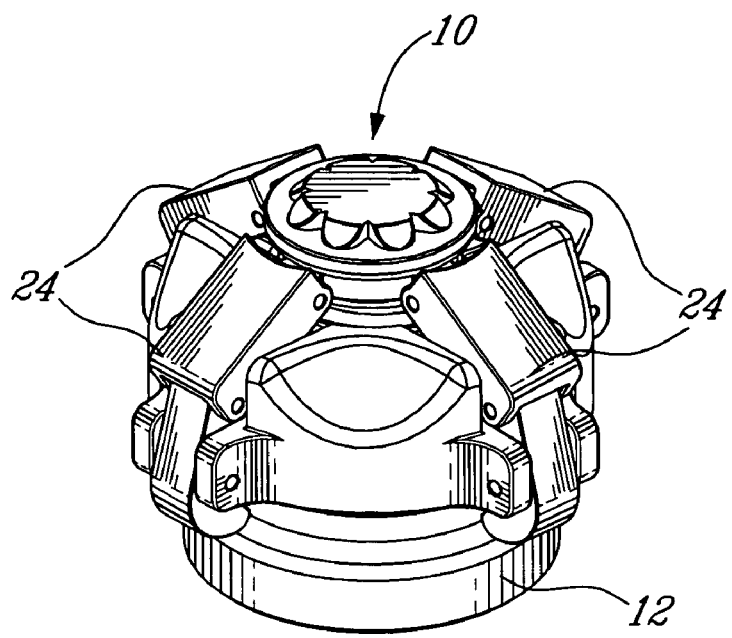
FIG. 4 is the perspective view of the cap of FIG. 1 with the latches in an unlatched position.

FIG. 1 illustrates a cap 10 for blocking a pipe 12. As better seen in FIG. 5, the pipe 12 includes a rim 14. The rim 14 defines a pipe aperture 16 (better shown in FIG. 8).

Referring to FIG. 3, the cap includes a body 18 for blocking the pipe aperture 16. The body 18 includes a bore 20 having a threaded bore portion 22. The cap 10 further includes at least one latch 24 mounted to the body 18 and a plug 26 for threaded engagement with the threaded bore portion 22.

As shown in FIG. 1, the cap 10 shown in the drawings includes four latches 24. However, it is within the scope of the invention to have caps having any other number of latches 24.

Figure 5:
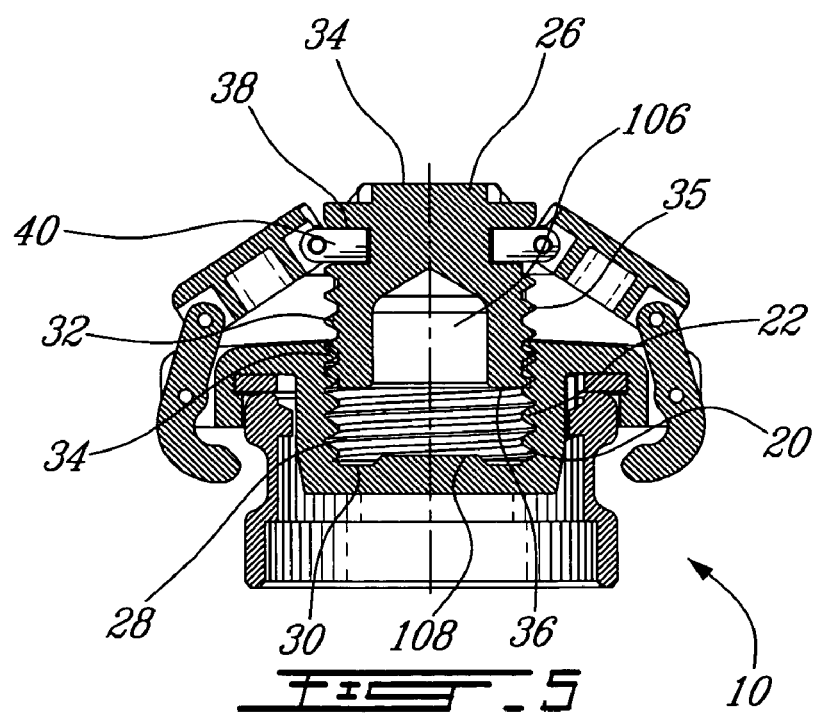
FIG. 5 is a cross sectional view of the cap of FIG. 4, taken along the line 3—3 of FIG. 2.

Each of the latches 24 is movably mounted on the body 18 for movement between a latched position, wherein the latch 24 engages the rim 14, as shown in FIGS. 1, 2 and 3, and an unlatched position wherein the latch 24 disengages the rim 14, as shown in FIGS. 4 and 5.

The plug 26 converts a rotational movement of the plug 26 relative to the bore 20 between a plug first position and a plug second position. The plug is operatively coupled to the latches 24 for moving the latches 24 between the latched and unlatched positions in response to the plug 26 being moved between the plug first position and the plug second position.

Accordingly, a rotation of the plug 26 allows latching and unlatching the latches 24. This in turn allows for the removal of the cap 10 from the pipe 12 in order to access the aperture 16 when the latches 24 are unlatched from the rim 14. When the latches 24 are in the latched position, the cap 10 is secured to the pipe 12 and is therefore relatively hard to remove therefrom.

As better seen in FIG. 5, the bore 20 defines a bore peripheral surface 28 and a bore bottom surface 30 extending substantially inwardly from the bore peripheral surface 28. The plug 26 defines a plug peripheral surface 32, a plug top surface 34 extending substantially inwardly from the plug peripheral surface 32, and a plug bottom surface 36 extending substantially inwardly from the plug peripheral surface 32. The plug bottom surface 36 is substantially opposed to the plug top surface 34 and substantially annular in shape. The plug peripheral surface 32 includes a plug threaded portion 35 for threaded engagement with the bore threaded portion 32.

The plug peripheral surface 32 further includes a circumferential groove 38 extending substantially inwardly within the plug 26. The circumferential groove 38 is for receiving a collar 40 that is rotatably mounted therein. The collar 40 is connected to the latches 24 and will be described in further details hereinbelow.

Referring to FIG. 2, the plug top surface 34 defines a mating portion 42 for mating with a tool 44, shown in FIGS. 9A and 9B, and selectively allowing a rotation of the plug 26 in response to the rotation of the tool 44. The tool 44 is described in further details hereinbelow.

The mating portion 42 includes a generally frustoconical section 46 extending substantially outwardly from the plug 26. The frustoconical section is substantially collinear with the rest of the plug 26.

In a specific embodiment of the invention, the frustoconical section 46 is a frustum of a cone having a longitudinal-axis-to-external-surface angle selected from an interval of about 30° to about 60°. The longitudinal-axis-to-external-surface of a cone is an angle between a longitudinal axis of the cone and a sidewall of the cone. In a specific embodiment of the invention, the longitudinal-axis-to-external-surface angle is about 45°. However, in alternative embodiments of the invention, the longitudinal-axis-to-external-surface angle takes any other suitable value.

It is advantageous in some embodiments of the invention, to have an apex half angle selected such that an unauthorized person would experience great difficulty in securing a tool different from the tool 44 to the mating portion 46. Therefore, a functionality provided by the mating portion 42 is to prevent unauthorized removal of the cap 10 from the pipe 12.

The frustoconical section 46 is provided with a plurality of substantially inwardly extending notches 48 extending from a periphery 50 of the frustoconical section 46 towards a center 52 of the frustoconical section 46.

In a specific embodiment of the invention, between 8 and 12 notches are provided. In a very specific embodiment of the invention, 8 notches are provided, as shown in the drawings. However, in alternative embodiments of the invention, any other suitable number of notches is provided.

Each of the notches 48 includes an apex portion 54 connecting two accurate notches sidewalls 56.

In some embodiments of the invention, the angle of the two sidewalls 56 at the apex 54 is from about 45 degrees to about 90 degrees. In a specific embodiment of the invention shown in the drawings, this angle is about 60 degrees. However, it is within the scope of the invention to have this angle taking any other suitable value.

The accurate notches sidewalls 56 define a plurality of peripheral petals 58. These petals 58 engage an engagement portion 110 of the tool 44, shown in FIGS. 9A and 9B.

Referring to FIG. 8, the collar 40 includes a substantially annular portion 62 and a plurality of latch attachments 64 extending substantially outwardly therefrom. The latches 24 are connected to the latched attachments 64.

In a specific embodiment of the invention shown in the drawings, the collar 40 includes two half collar portions 66 and 68 that are assembled together to form the collar 40. However, in alternative embodiments of the invention, the collar 40 is manufactured and shaped in any other suitable manner.

Still referring to FIG. 8, each of the latches 24 includes first and second pivotably connected latch members 70 and 72. The first latch member 70 is pivotably connected to one of the latch attachments 64. Each of the second latch members 72 is pivotably connected to the body 18.

Manners of pivotably connecting latch members to each others and to attachments and bodies are well known in the art. For example, such a manner includes the use of a rivet. Another manner of effecting such a pivotable connection includes the use of nuts and bolts. However, it is within the scope of the invention to have pivotable connections that are made in any other suitable manner.

The second latch member 72 includes first and second ends 74 and 76. The second end 74 is for engaging the pipe 12.

In some embodiments of the invention, the pipe 12 includes a flange 80 extending substantially outwardly from the rim 14. In this case the second end 74 includes a hook 82 for hooking the flange 80. In alternative embodiments of the invention, the second member 76 and the rim 14 are shaped in any other suitable manner.

The second latch member 72 is mounted to the body 18 at a location intermediate the first and second ends 70 and 72. Also, the first and second members 70 and 72 are pivotably interconnected at respective extremities thereof. The first latch member 70 is itself pivotably connected to the collar 40 at the other extremity thereof.

Figure 10A:
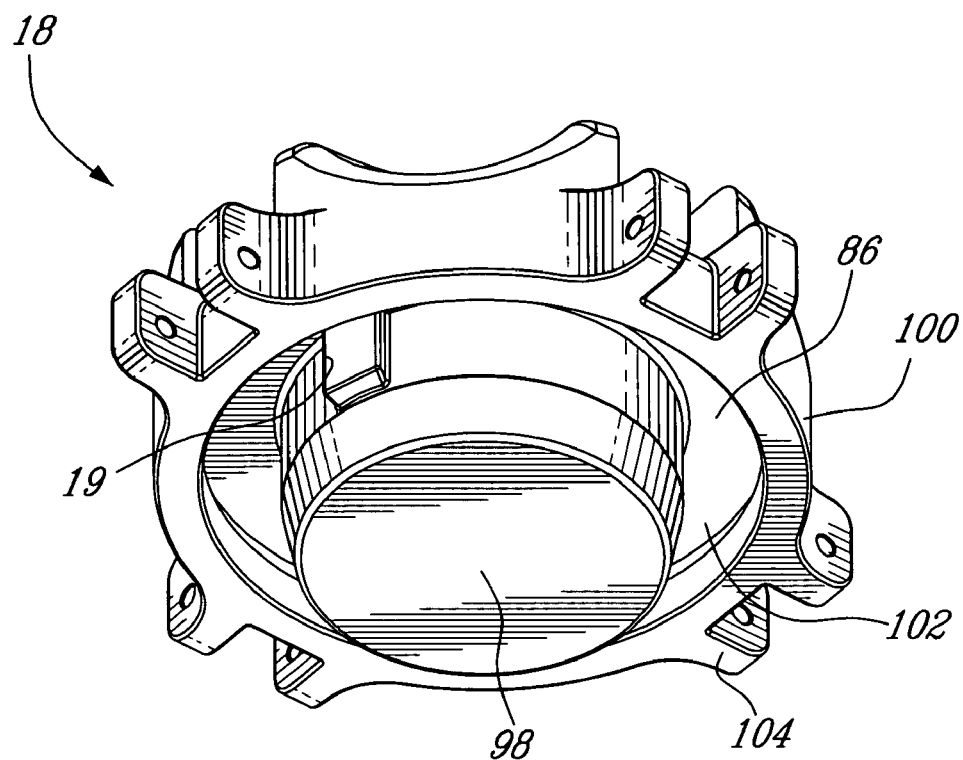
FIG. 10A is a bottom perspective view of a body of the cap of FIG. 1.
Figure 10B:
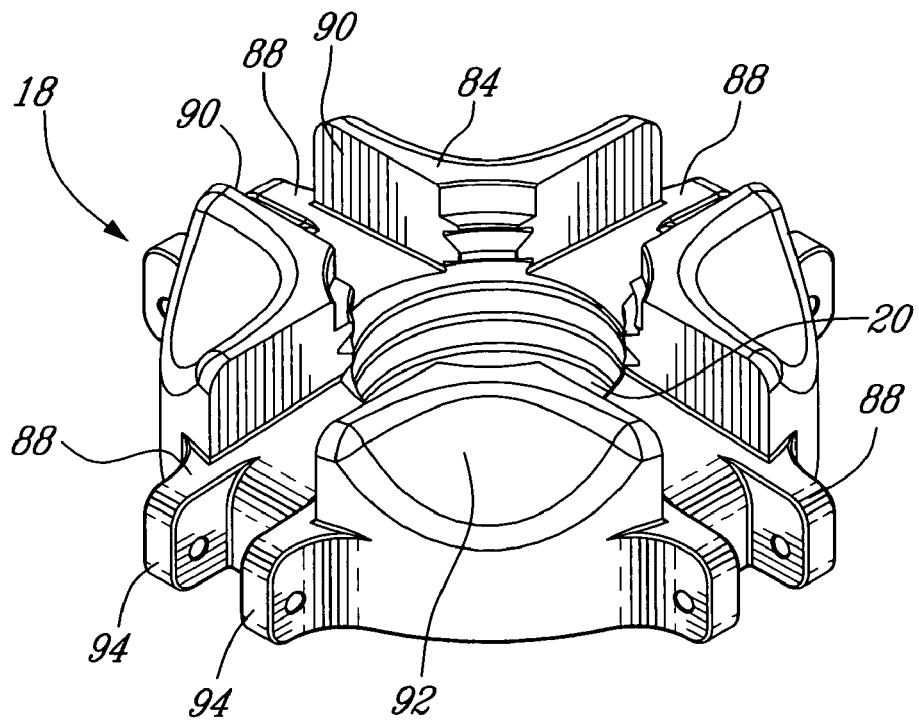
FIG. 10B is a top perspective view of the body of the cap of FIG. 1.

As shown respectively in FIGS. 10B and 10A, the body 18 includes top and bottom substantially opposed body surfaces 84 and 86. The bore 20 extends within the top body surface 84. Referring to FIG. 10B, the top body surface 84 includes a plurality of channels 88. The channels 88 each receive at least in part a respective latch 24 when the latch 24 is in the latched position. However, in alternative embodiments of the invention, the surface 84 does not include channels 88.

Each of the channels 88 is defined by two channel walls 90 extending substantially radially within the top body surface 84. Each of the channel walls 90 further defines accurate indentation 92 extending within the body 18 between the channels 88.

The channels 88 receive the latches 24 and help reduce the risk that an unauthorized user forces open the cap 10 by engaging the latches 24 and applying a leverage thereto.

The indentations 92 are shaped to facilitate the flow of any water that might come in contact with the cap 10. Therefore, the indentations 92 reduce the risk that water will become trapped in the cap 10 and freeze, thereby applying large stresses onto the cap 10. Such stresses might cause, in extreme cases, the cap 10 to fail. In addition, the shape of the indentations 92 reduces stress concentrations within the body 18 and therefore increases the structural rigidity of the cap 10.

The body 18 further includes a plurality of attachment protrusions 94 for pivotably attaching the latches 24 to the body 18. The attachment protrusions 94 extend substantially outwardly from the body 24. In some embodiments of the invention, the attachment protrusions 94 are provided pairwise and received therebetween the second latch members 72.

Referring now to FIG. 10A, the bottom body surface 86 includes a substantially centrally located protrusion 98 that is positionable, at least in part, within the pipe 12. The protrusion 98 defines the bore 20 at least in part. In addition, the bottom body surface 86 includes a circumferential substantially peripherally located flange 100 extending from the body 86. The flange and the central protrusion 98 define a substantially annular body groove 102 therebetween. In some embodiments of the invention, as shown in FIG. 3, the annular body groove 102 receives a substantially annular gasket 104.

In some embodiments of the invention, the pipe 12 includes a pipe rotation-inhibiting protrusion 21 (shown in FIG. 8) extending substantially radially within the pipe 12. In addition, the body 18 includes a substantially radially extending body rotation-inhibiting protrusion 19 (shown in FIG. 10A) provided within the body groove 102 for engaging the pipe rotation-inhibiting protrusion 21 and inhibiting a rotation of the body 18 with respect to the pipe 12. Therefore, the body and pipe rotation-inhibiting protrusions 19 and 21 allow the user to turn the plug 26 with respect to the body 18 even in cases wherein frictional forces between the body 18 and the pipe 12 are not sufficient to prevent a rotation of the body 18 with respect to the pipe 12. The reader skilled in the art will readily appreciate that in other embodiments of the invention, the pipe 12 does not include a pipe rotation-inhibiting protrusion 21 and the body 18 does not include a body rotation-inhibiting protrusions 19.

Referring to FIG. 5, in some embodiments of the invention, the plug 26 includes a central recess 106 extending within the plug 26 from the plug bottom surface 36. Also, the bore 20 includes a protrusion 108 extending substantially outwardly from the bore bottom surface 30. The protrusion 108 engages the central recess 106 upon the plug 26 being threaded within the bore 20 towards the bore bottom surface 30.

In some embodiments of the invention, the protrusion 108 is configured and sized for centering the plug 106 within the bore 20. To that effect, the protrusion 108 is substantially frustoconical. However, in alternative embodiments of the invention, the protrusion 108 adopts any other suitable configuration. Also, in alternative embodiments of the invention, the bore does not include a protrusion 108 and the plug 26 does not include a central recess 106.

The tool 44 is described hereinbelow with reference to FIGS. 9A and 9B. The tool 44 includes an engagement section 110, a stick 112, a handle 114, a stick-to-handle coupler 116, and a fastener 118. The engagement section 110 is connected to the stick 112. The coupler 116 receives the handle 114 and the stick 112 and attaches together the handle 114 and the stick 112 through the fastener 118 blocking the coupler 116 with the handle 114 and the stick 112. To that effect, the coupler 116 includes a coupling section 119 from which a flange 120 extends substantially outwardly therefrom and peripherally thereto. The coupling section 119 is substantially cylindrical and includes a handle receiving aperture 122 and a fastener receiving aperture 124.

The handle 114 is substantially elongated and substantially cylindrical with a fastening aperture 126 provided substantially midway between its two extremities.

The stick 112 is also substantially elongated and includes an engagement section coupling portion 128 for attaching the engagement section 110 thereto. In addition, the stick 112 includes a handle receiving aperture 130 and a fastener receiving aperture 132.

In some embodiments of the invention, the stick 112 is substantially tubular and the handle receiving aperture 130 is substantially perpendicular to a longitudinal axis of the stick 112. Also, the fastener receiving aperture 132 is also substantially perpendicular to the longitudinal axis of the stick 112 and is also substantially perpendicular to the handle receiving aperture 130.

When assembled, the mating section 110 is fastened to the engagement section coupling portion 128 in any suitable manner, for example through soldering or through the use of screws, among others. Also, the coupler 116 is inserted within the stick 112 and the handle 114 is subsequently inserted within the handle receiving apertures 118 and 130. The fastening aperture 126 is substantially aligned with the apertures 124 and 132, which allow the insertion of the fastener 118 therewithin. In a specific embodiment of the invention, the fastener 118 includes a nut and a bolt, in alternative embodiments of the invention, the fastener 118 includes screws or any other suitable fastening device.

In use, the cap 10 is provided onto the rim 14 with the latches 24 in the unlatched configuration. Subsequently, the tool 44 is manipulated by an intended user so that the engagement section 110 engages the mating section 42 of the plug 26. Then, the user rotates the plug 26 so that the plug 26 is threaded into the bore 20. This causes the collar 40 to be pushed towards the pipe 12 and therefore moves the latches 24 toward the latched configuration. Indeed, when the collar 40 is moved towards the pipe 12, an angle between the first latch member 70 and the rim 14 comes closer to 90 degrees. Consequently, this pushes the end 76 of the second latch member 72 away from the plug 26. In turn, this causes the other end 74 of the second member 72 to be pushed towards the pipe 12.

In some embodiments of the invention, as shown in FIG. 1, the latches are in the latched configuration when the first latch members 26 arrive substantially flush with an upper part of the channels 88. Also, in this embodiment of the invention, the top surface 34 of the plug 26 also arrives substantially flush with these channels 88. Therefore, in this configuration, only the mating section 42 protrudes from the cap 10.

To remove the cap 10, the above described operations are performed in reverse sequence.

Figure 6:
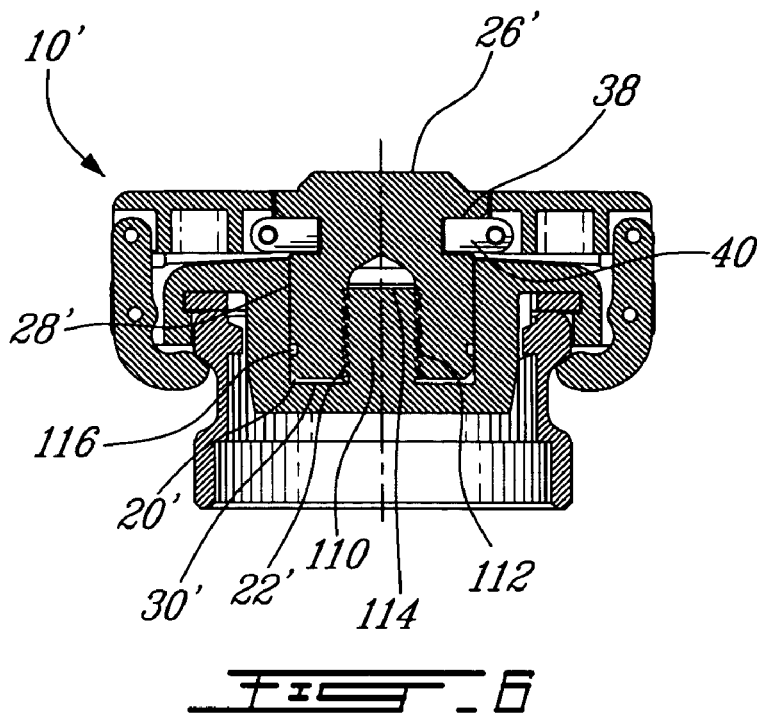
FIG. 6 is a cross sectional view of an alternative embodiment of the cap of FIG. 1, with the latches in the latched position.
Figure 7:
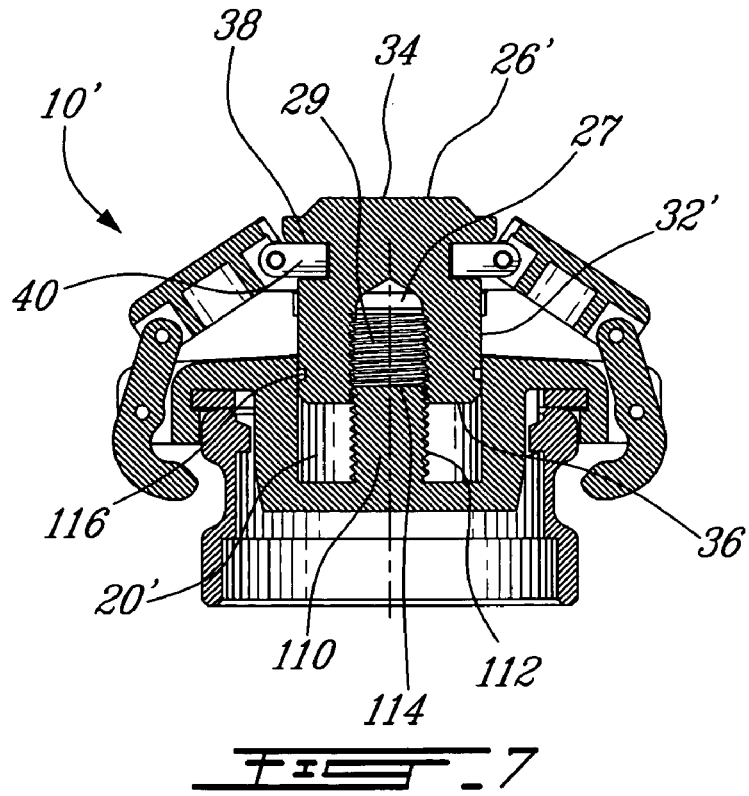
FIG. 7 is a cross sectional view of the cap of FIG. 6, with the latches in the unlatched position.

FIGS. 6 and 7 illustrate cross sections of a cap 10' that is very similar to the cap 10. The cap 10' differs from the cap 10 only in the configuration of the bore of the body and the plug. In the cap 10', a bore 20' defines a substantially smooth bore peripheral surface 28' and a bore bottom surface 30' extending substantially inwardly from the bore peripheral surface 28'. The bore further includes a mast 110 extending substantially outwardly from the bore bottom surface 30'. The mast 110 includes a mast peripheral wall 112 and a mast top wall 114 extending substantially inwardly therefrom. A threaded bore portion 22' is provided within the mast peripheral wall 112.

A plug 26' similar to the plug 26 includes a plug peripheral surface 32', a plug top surface 34 extending substantially inwardly from the plug peripheral surface 32' and a plug bottom surface 36 extending substantially inwardly from the plug peripheral surface 32'. The plug top surface 34 is substantially opposite the plug bottom surface 36. In addition, the plug 26' includes a plug central recess 27 extending within the plug 26' from the plug bottom surface 36. The plug central recess 27 includes a threaded plug portion 29 for threaded engagement with the threaded bore portion 22'.

In some embodiments of the invention, the plug peripheral surface includes a circumferential notch 116 extending substantially inwardly within the plug 26'. The plug 26' is for receiving a gasket that allows to substantially seal the bore from water infiltration. In some embodiments of the invention, the gasket is an annular gasket. In alternative embodiments of the invention, the gasket is any other suitable gasket.

The operation of the cap 10 is substantially similar to the operation of the cap 10' and will therefore not be described.

Although the present invention has been described hereinabove by way of preferred embodiments thereof, it can be modified, without departing from the spirit and nature of the subject invention as defined in the appended claims.

What is claimed is:

1. A cap for blocking a pipe, the pipe having a rim at an end thereof, the rim defining a pipe aperture, said cap comprising:
   a. a body for sealingly contacting and blocking the pipe aperture, said body including a bore having a threaded bore portion;
   b. a plug for threaded engagement with said threaded bore portion; and
   c. a latch attached to both said plug and said body, said latch being movable between a latched position, wherein said latch engages the rim, and an unlatched position, wherein said latch disengages the rim;
   d. said latch being operatively coupled to said both said plug and said body such that with said body substantially sealingly contacting said pipe, a rotational movement of said plug relatively to said body causes said latch to move between said latched and unlatched positions.

2. A cap as defined in claim 1, wherein said bore defines a bore peripheral surface and a bore bottom surface extending substantially inwardly from said bore peripheral surface, said threaded bore portion being provided within said bore peripheral surface.

3. A cap as defined in claim 2, wherein said plug defines a plug peripheral surface, a plug top surface extending substantially inwardly from said plug peripheral surface, and a plug bottom surface extending substantially inwardly from said plug peripheral surface and substantially opposite said plug top surface, said plug peripheral surface including a threaded plug portion for threaded engagement with said threaded bore portion.

4. A cap as defined in claim 3, wherein:
   a. said plug peripheral surface includes a circumferential groove extending substantially inwardly within said plug; and
   b. said plug further including a collar rotatably mounted within said circumferential groove, said collar being connected to said latch.

5. A cap as defined in claim 4, wherein said collar includes a substantially annular portion and a latch attachment extending substantially outwardly therefrom, said latch being connected to said latch attachment.

6. A cap as defined in claim 5, wherein said top surface defines a mating portion for mating with a tool and selectively allowing a rotation of said plug in response to a rotation of said tool.

7. A cap as defined in claim 6, wherein said mating portion includes a generally frustoconical section extending substantially outwardly from said plug.

8. A cap as defined in claim 7, wherein said frustoconical section is a frustum of a cone having a longitudinal-axis-to-external-surface angle selected from an interval of about 30 degrees to about 60 degrees.

9. A cap as defined in claim 8, wherein said frustoconical section is a frustum of a cone having a longitudinal-axis-to-external-surface of about 45 degrees.

10. A cap as defined in claim 9, wherein said frustoconical section is provided with a plurality of substantially inwardly extending notches extending from a periphery of said frustoconical section towards a center of said frustoconical section.

11. A cap as defined in claim 10, wherein said plurality of substantially inwardly extending notches includes between 8 and 12 notches.

12. A cap as defined in claim 9, wherein said notches each include an apex portion connecting two arcuate notches side walls.

13. A cap as defined in claim 12, wherein an angle between said two arcuate notches side walls at said apex portion is from about 45 degrees to about 90 degrees.

14. A cap as defined in claim 13, wherein an angle between said two arcuate notches side walls at said apex portion is about 60 degrees.

15. A cap as defined in claim 5, wherein said plug includes a central recess extending within said plug from said plug bottom surface.

16. A cap as defined in claim 15, wherein said bore includes a protrusion extending substantially outwardly from said bore bottom surface, said protrusion engaging said central recess upon said plug being threaded within said bore towards said bore bottom surface.

17. A cap as defined in claim 16, wherein said protrusion is substantially frustoconical.

18. A cap as defined in claim 5, wherein said latch includes first and second pivotably connected latch members, said first latch member being pivotably connected to said latch attachment and said second latch member being pivotably connected to said body.

19. A cap as defined in claim 18, wherein:
   a. the pipe includes a flange extending substantially outwardly from the rim; and
   b. said second latch member includes a hook for hooking the flange.

20. A cap as defined in claim 19, wherein said second latch member is mounted to said body at a location intermediate said first and second ends.

21. A cap as defined in claim 20, wherein:
   a. said body includes top and bottom substantially opposed body surfaces, said bore extending within said top body surface; and
   b. said top body surface includes a channel for receiving at least in part said latch when said latch is in said latched position.

22. A cap as defined in claim 21, wherein said bottom body surface includes a substantially central protrusion positionable at least in part within said pipe.

23. A cap as defined in claim 22, wherein said bottom body surface includes a circumferential substantially peripherally located flange extending from said body, said flange and said central protrusion defining a substantially annular body groove therebetween.

24. A cap as defined in claim 23, further comprising a substantially annular gasket provided within said body groove.

25. A cap as defined in claim 24, wherein:
   a. said pipe includes a pipe rotation-inhibiting protrusion extending substantially radially within said pipe; and
   b. said body includes a substantially radially extending body rotation-inhibiting protrusion provided within said body groove for engaging said pipe rotation-inhibiting protrusion and inhibiting a rotation of said body with respect to the pipe.

26. A cap as defined in claim 1, wherein:
   a. said bore defines a bore peripheral surface and a bore bottom surface extending substantially inwardly from said bore peripheral surface;
   b. said bore further includes a mast extending substantially outwardly from said bore bottom surface, said past including a mast peripheral wall and a mast top wall extending substantially inwardly therefrom;
   c. said threaded bore portion is provided within said mast peripheral wall;
   d. said plug includes a plug peripheral surface, a plug top surface extending substantially inwardly from said plug peripheral surface, and a plug bottom surface extending substantially inwardly from said plug peripheral surface and substantially opposite said plug top surface;
   e. said plug includes a central recess extending within said plug from said plug bottom surface and including a threaded plug portion for threaded engagement with said threaded bore portion.

27. A cap as defined in claim 26, wherein said plug peripheral surface includes a circumferential notch extending substantially inwardly within said plug.

28. In combination, a cap as defined in claim 6 and a tool for mating with said mating section and selectively allowing a rotation of said plug in response to a rotation of said tool.

29. A combination as defined in claim 28, wherein said tool includes a stick, a handle and an engagement section, said stick interconnecting said engagement section and said handle, said engagement section mating with said mating section and selectively allowing a rotation of said plug in response to a rotation of said stick.

* * * * *